Aug. 4, 1936. W. N. BAKER ET AL 2,049,757
MACHINE FOR FILLING, CLOSING, AND SEALING BAGS
Filed Nov. 25, 1935 11 Sheets-Sheet 1
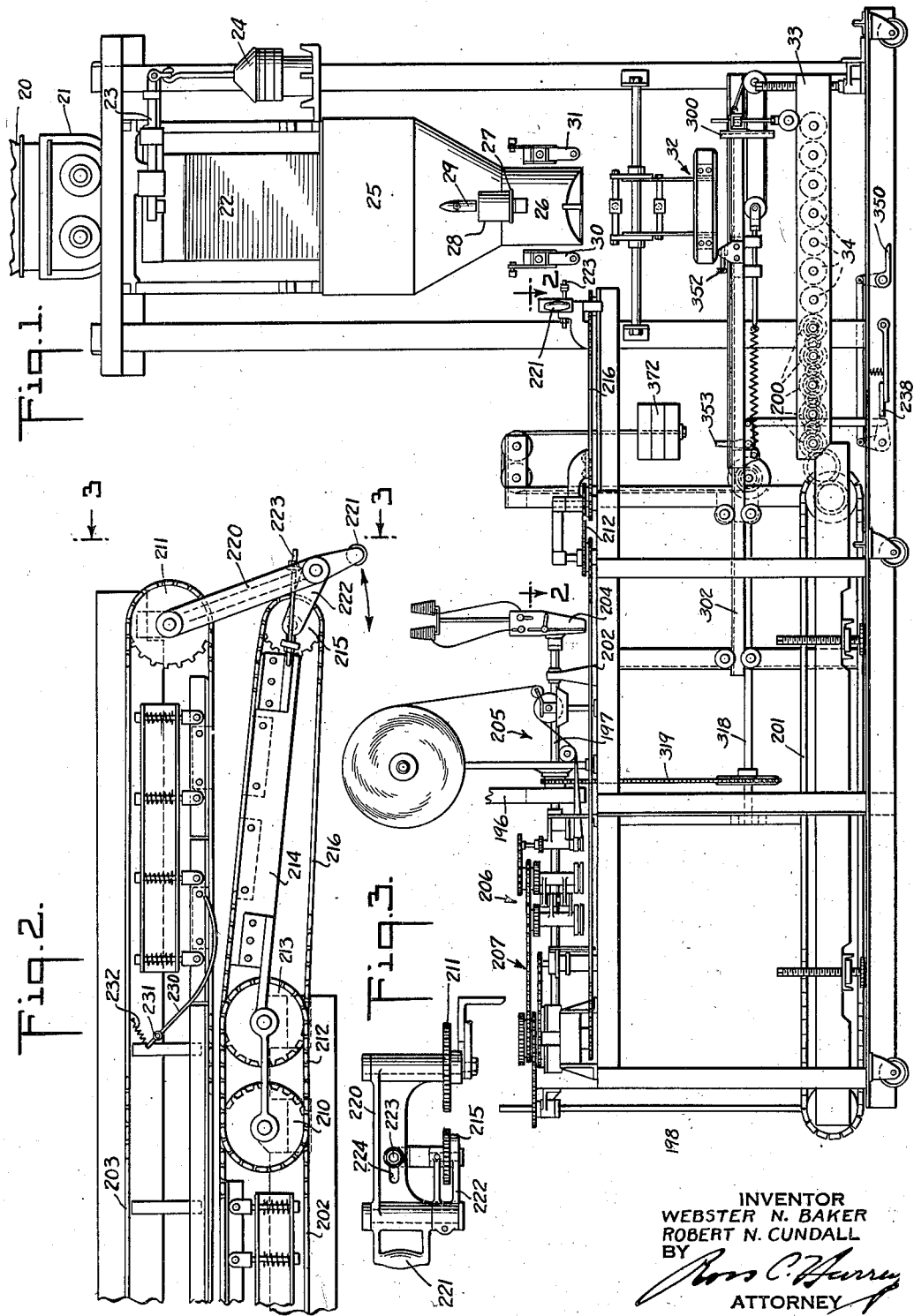
INVENTOR
WEBSTER N. BAKER
ROBERT N. CUNDALL
BY
ATTORNEY

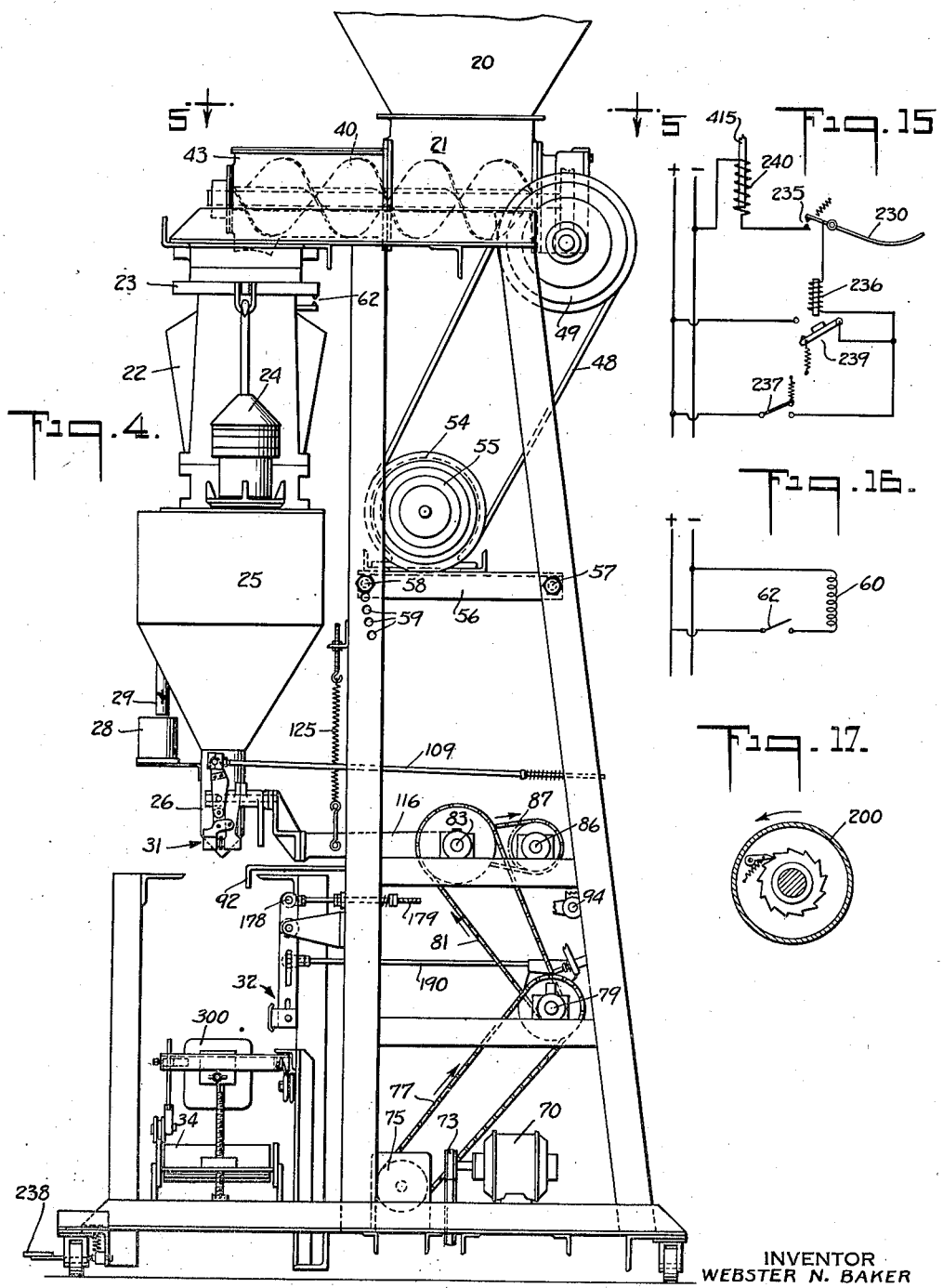

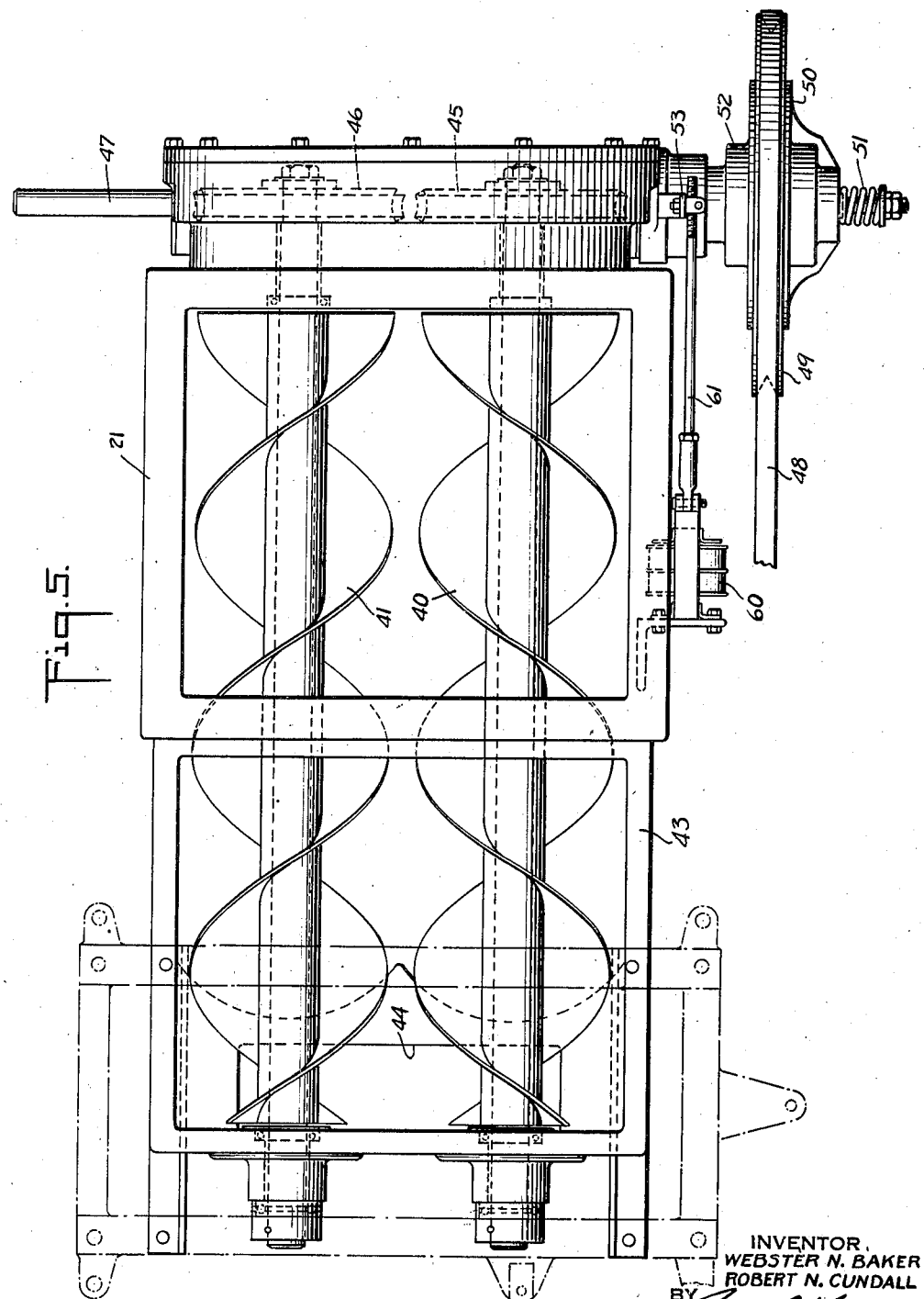

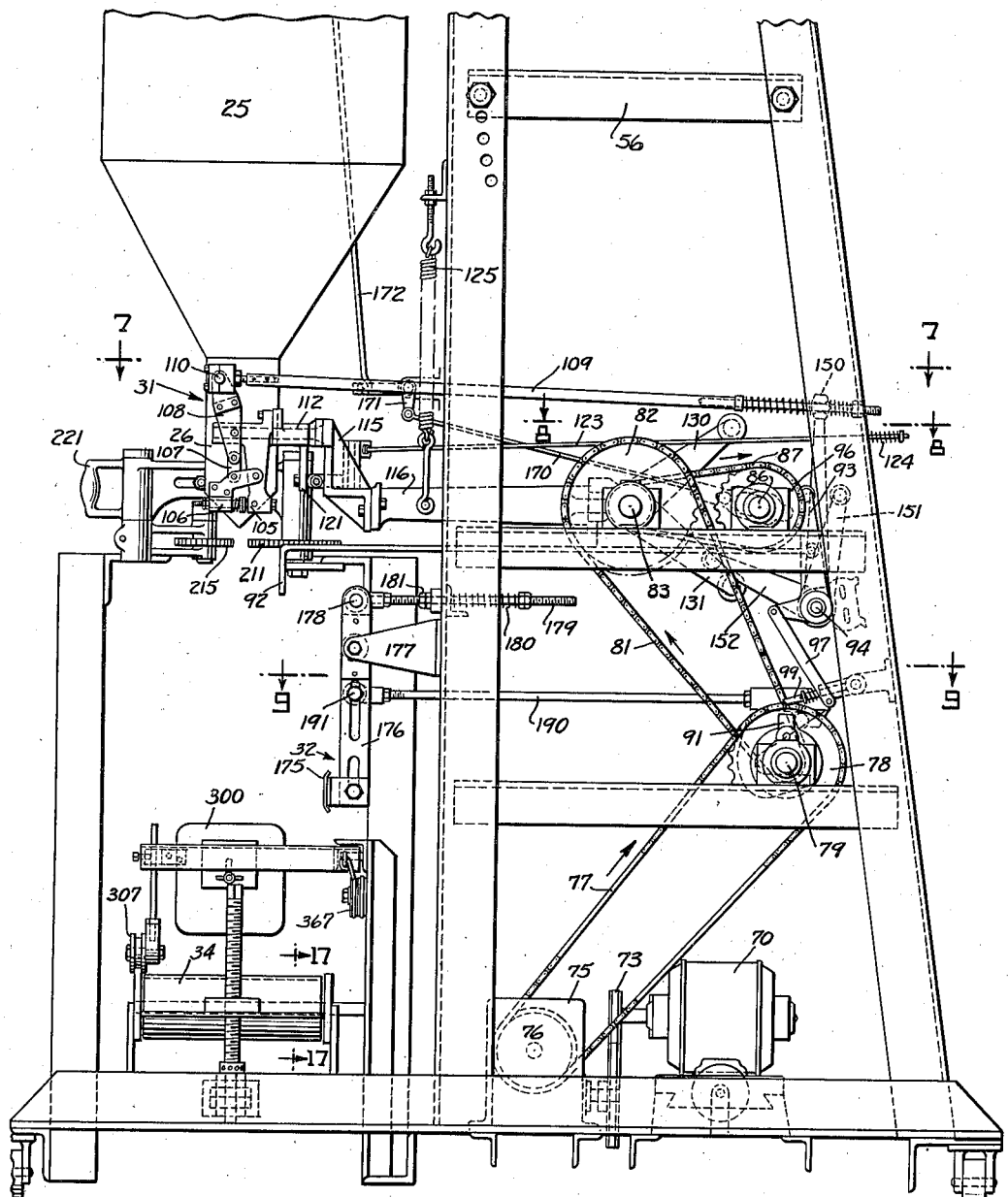

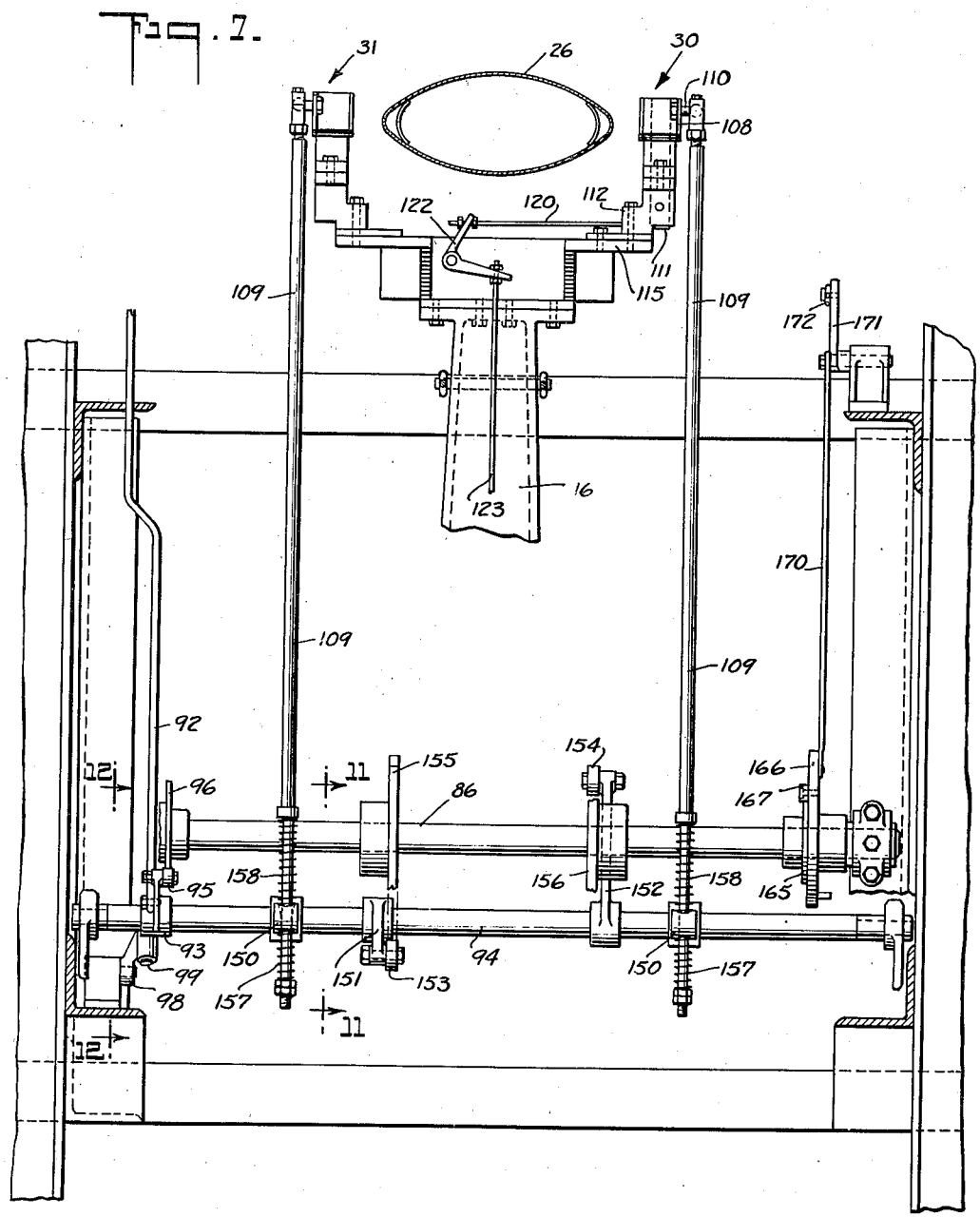

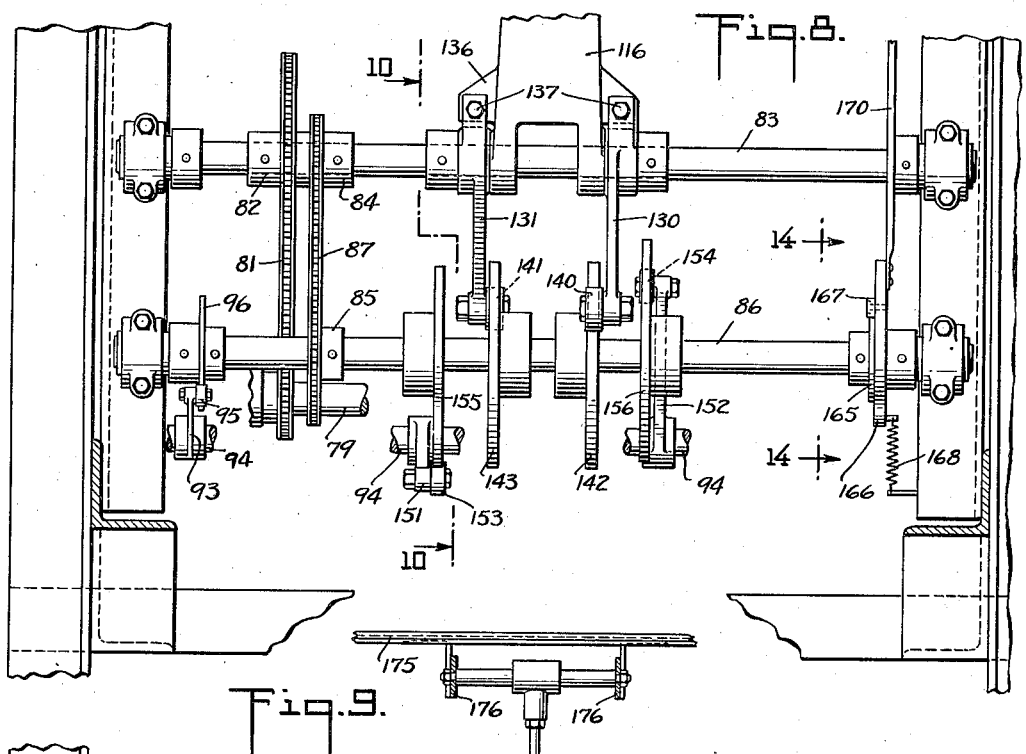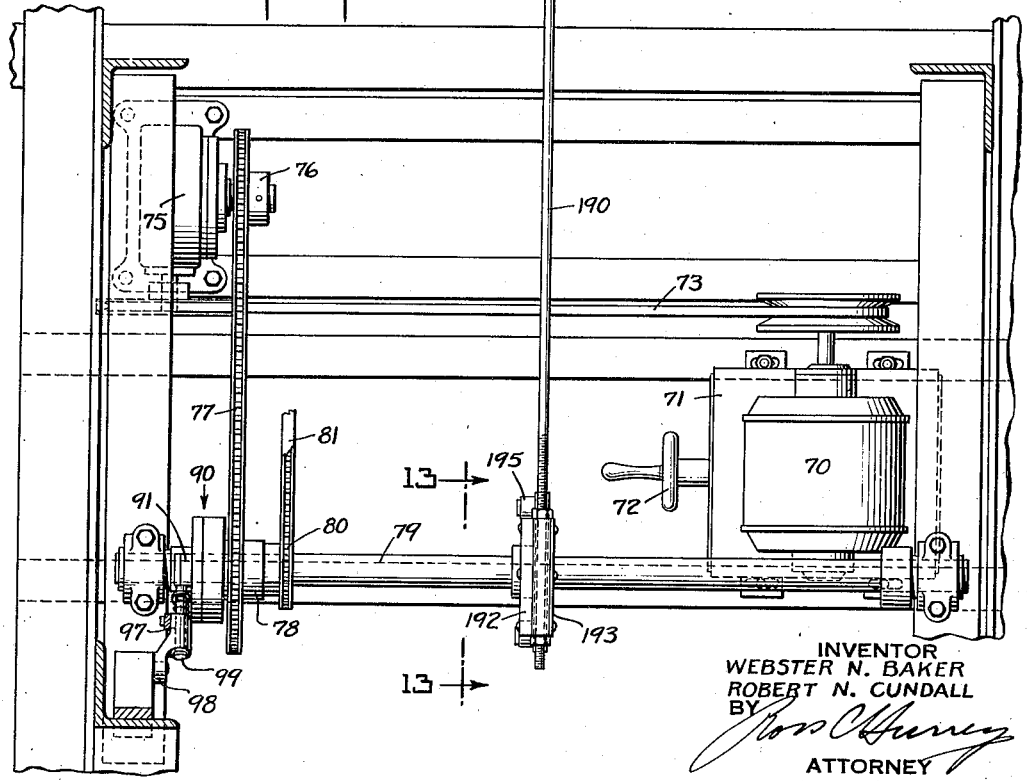

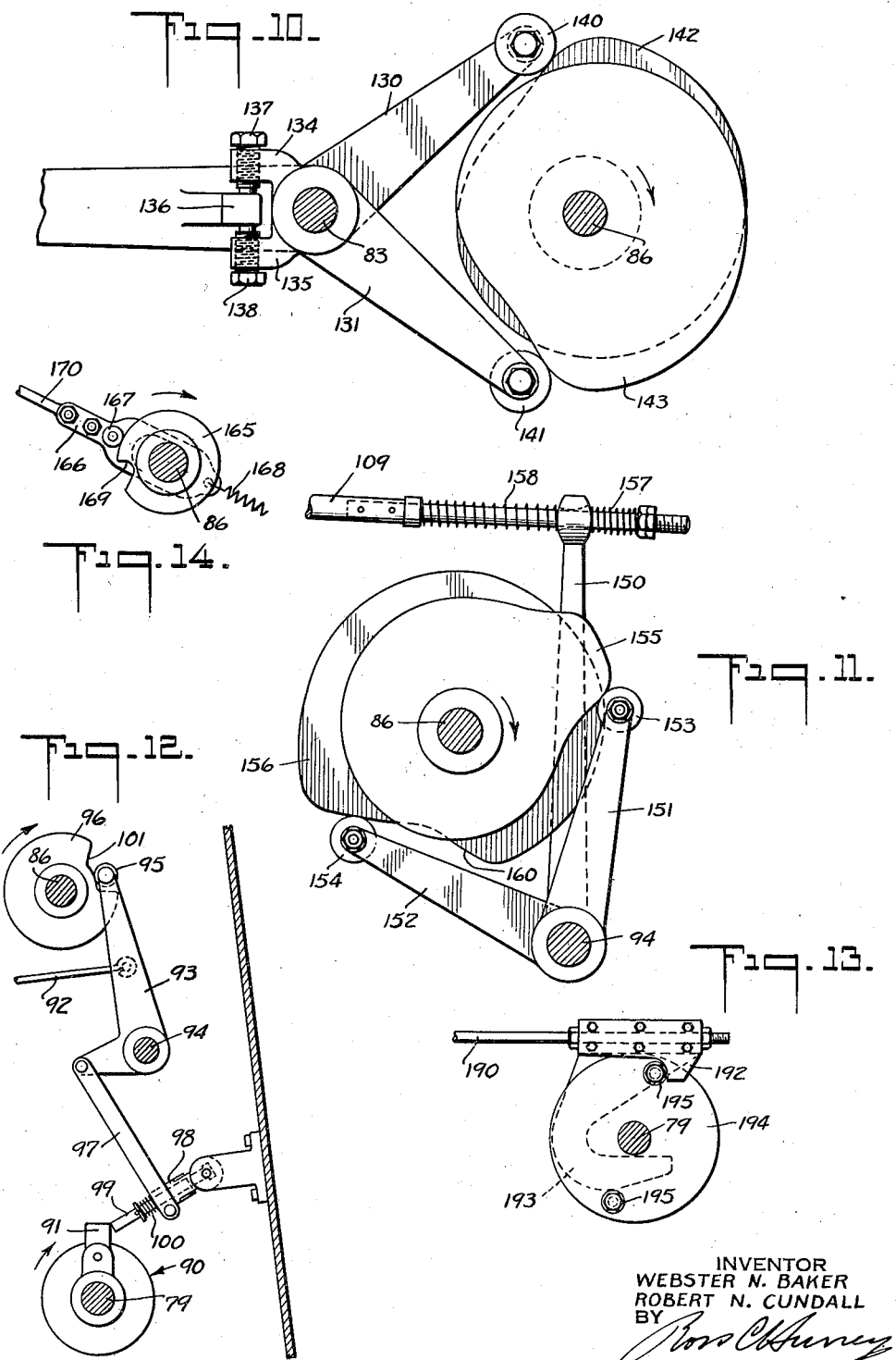

Aug. 4, 1936.                W. N. BAKER ET AL                2,049,757
              MACHINE FOR FILLING, CLOSING, AND SEALING BAGS
                    Filed Nov. 25, 1935          11 Sheets-Sheet 8
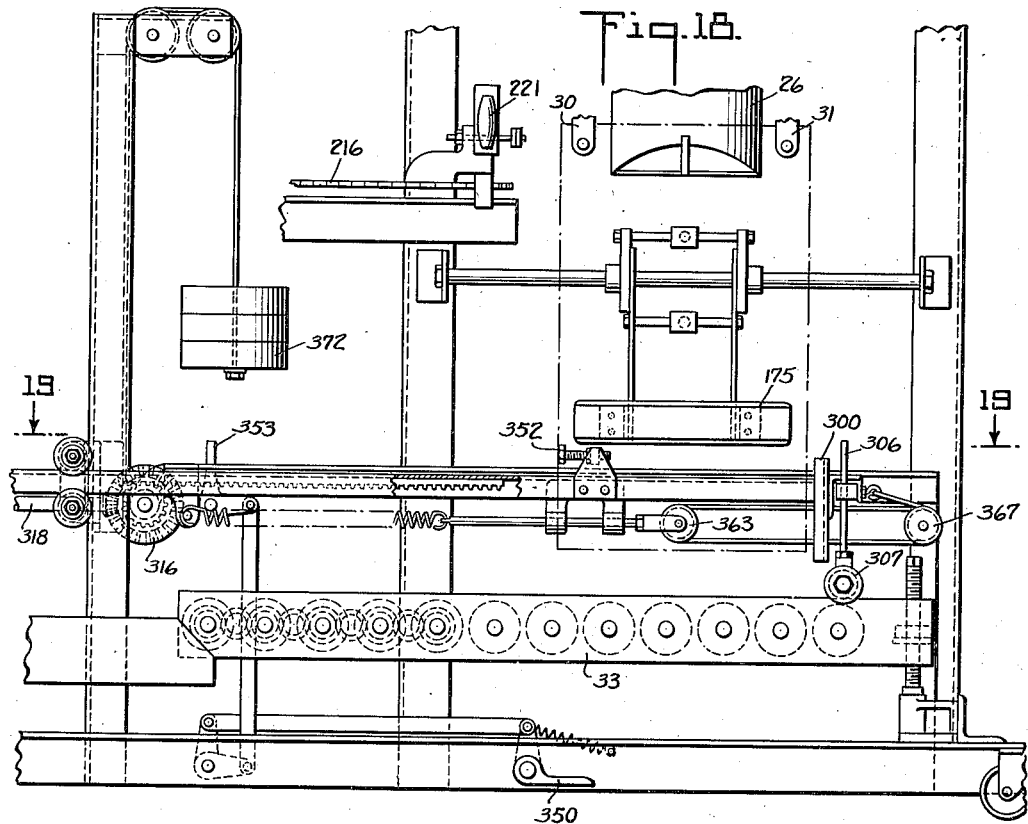
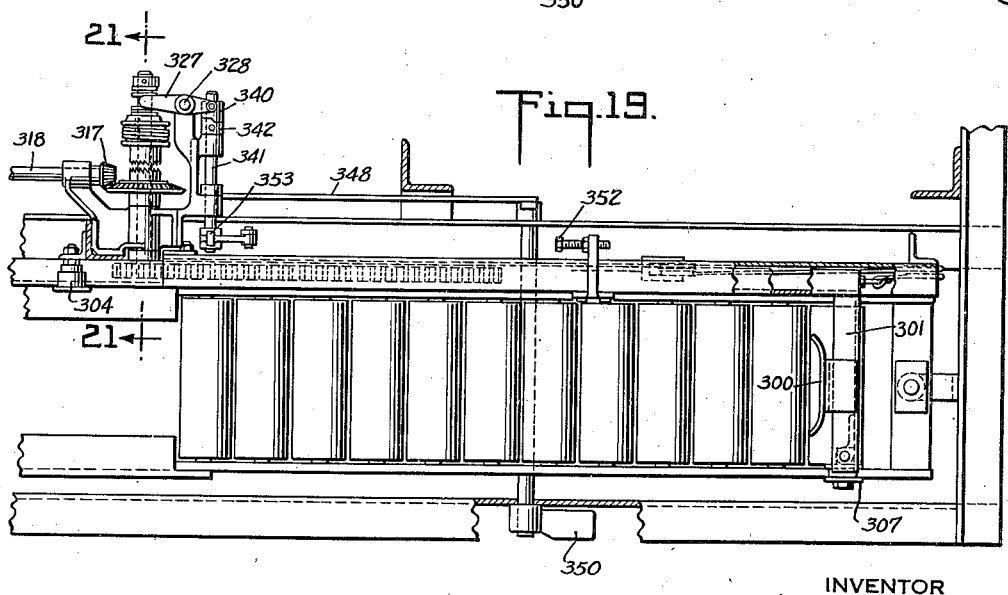
INVENTOR
WEBSTER N. BAKER
ROBERT N. CUNDALL
BY
ATTORNEY Aug. 4, 1936. W. N. BAKER ET AL 2,049,757
MACHINE FOR FILLING, CLOSING, AND SEALING BAGS
Filed Nov. 25, 1935 11 Sheets-Sheet 9
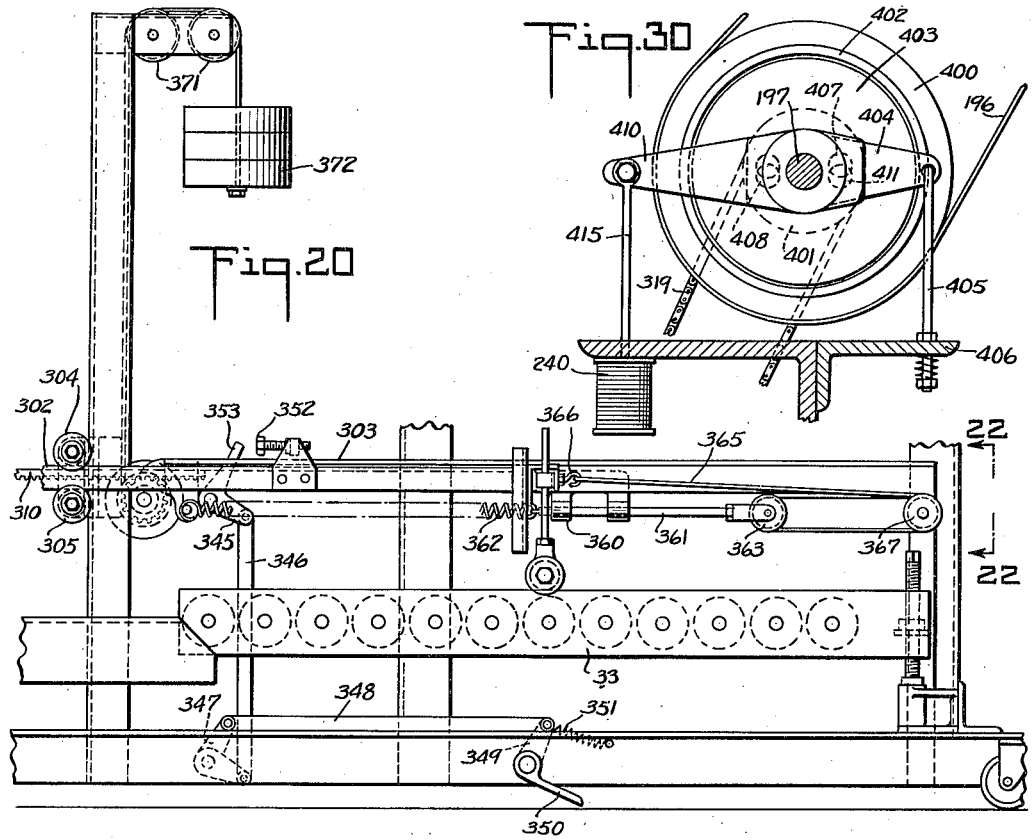
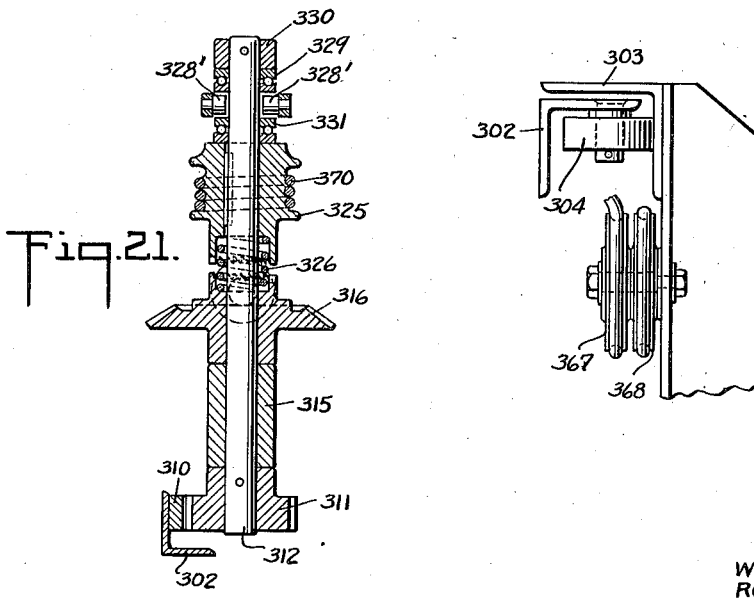
INVENTOR
WEBSTER N. BAKER
ROBERT N. CUNDALL
BY
ATTORNEY Aug. 4, 1936.  W. N. BAKER ET AL  2,049,757
MACHINE FOR FILLING, CLOSING, AND SEALING BAGS
Filed Nov. 25, 1935  11 Sheets-Sheet 10
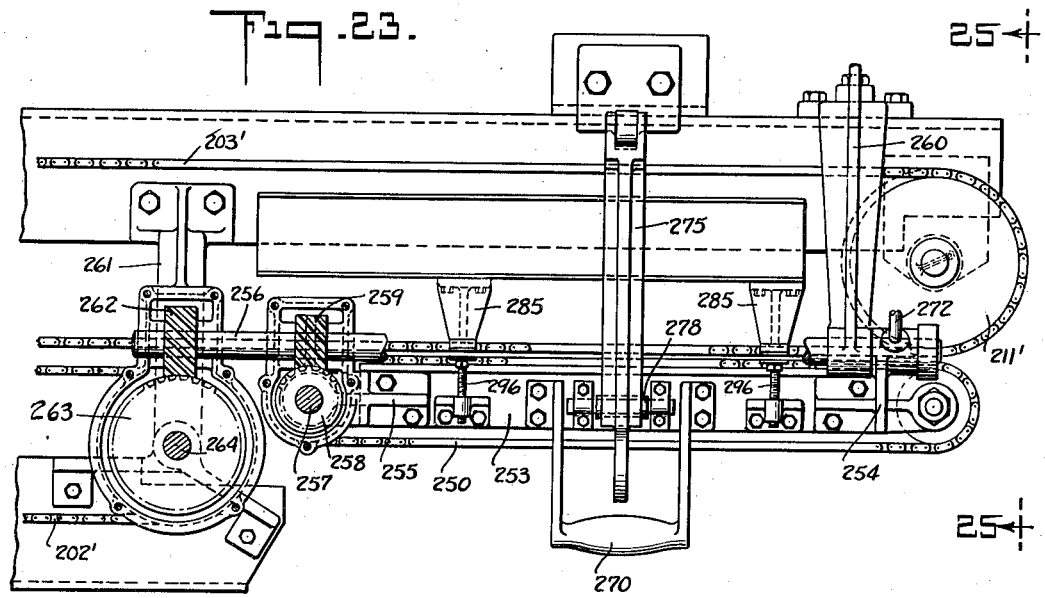
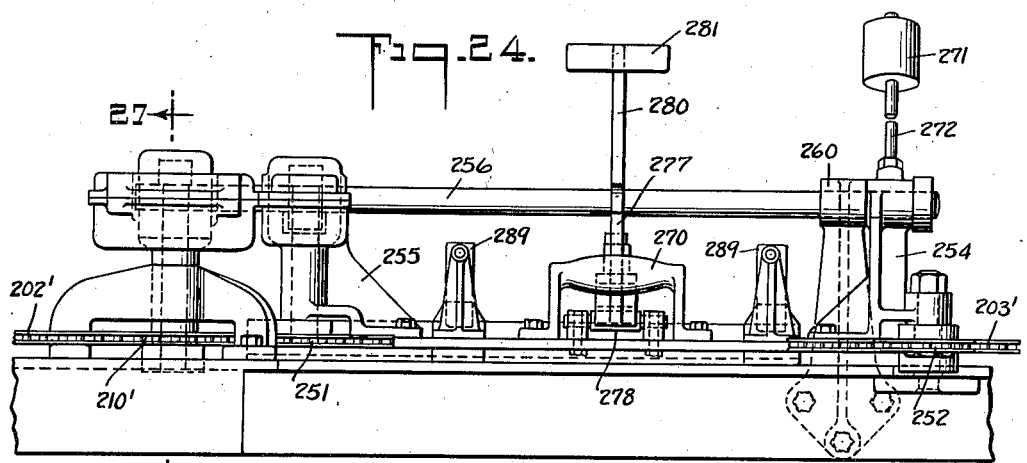
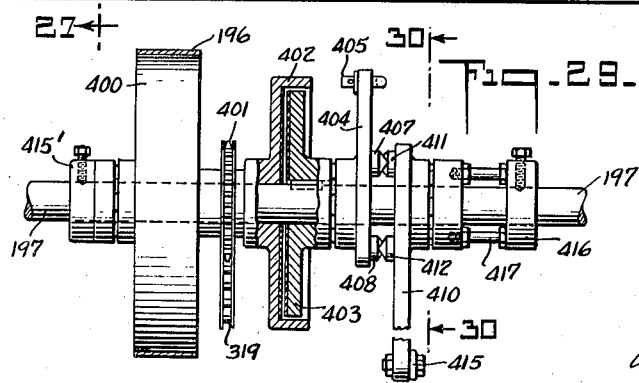
INVENTOR
WEBSTER N. BAKER
ROBERT N. CUNDALL
BY
ATTORNEY Aug. 4, 1936.   W. N. BAKER ET AL   2,049,757
MACHINE FOR FILLING, CLOSING, AND SEALING BAGS
Filed Nov. 25, 1935   11 Sheets-Sheet 11

INVENTOR
WEBSTER N. BAKER
ROBERT N. CUNDALL
BY
ATTORNEY

Patented Aug. 4, 1936

2,049,757

UNITED STATES PATENT OFFICE 2,049,757

MACHINE FOR FILLING, CLOSING, AND SEALING BAGS

Webster Noyes Baker, Baldwin, and Robert N. Cundall, Lackawanna, N. Y., assignors to Bagpak, Inc., New York, N. Y., a corporation of Delaware Application November 25, 1935, Serial No. 51,402

20 Claims. (Cl. 226—53)

The present invention relates to a machine for filling, closing and sealing bags, particularly paper bags of the multi-ply open mouth type adapted to contain from 50 to 100 pounds, more or less, of pulverulent or granular materials. The present invention is especially designed for use in such plants as have a fluctuating output, of which the peaks may be relatively high, but are not sustained for any great length of time. The invention is of special utility in plants which require machines having some of the advantages, but not the constant, high speed operation of machines such as disclosed in the copending applications of Robert N. Cundall and Lincoln A. Cundall, Serial No. 688,816, filed September 9, 1933, and of Howland F. Briggs, Serial No. 19,396, filed May 2, 1935, and which also require machines having all the advantages of, and a greater capacity than, machines such as disclosed in the copending applications of Robert N. Cundall and Lincoln A. Cundall, Serial No. 680,538, filed July 15, 1933, and Serial No. 757,772, filed December 17, 1934.

In particular, the machine comprises means for storing the material as it is manufactured, in a storage bin from the bottom of which a bag filling storage is removed as often as desired. The removing means operates concurrently with an automatic weighing device of a well known type, operating to segregate a correct charge from the remainder. It is sufficient to state that the weighing device is preferably of the type which has a weighing container within which an exactly weighed charge is received and held until discharged into the bag. Positioned beneath the weighing device is a hopper terminating at its lower end in an oval shaped filling spout about which the mouth of a bag may be placed and retained in position by suitable bag holding grippers, to be described. The operator, after placing the bag, starts the apparatus with the result that the charge is placed in the bag and the filled bag is lowered onto a roller conveyor table and released from the grippers, as will be described. The bag is then placed in a closing and sealing mechanism where the open end of the bag is stitched and sealed by means of a gummed tape.

The advantages of the present construction are that the operator of the filling machine may place and fill bags fairly rapidly since he need not follow the bag through the closing machine, and the construction of the closing and sealing machine prevents it from operating unless bags are continuously presented thereto. Inasmuch as the weighing, bag placing and bag filling operations require considerable time, the closing and sealing mechanism is arranged to operate only when a bag is placed therein and to stop as soon as the bag has progressed a sufficient distance to allow the insertion of a succeeding bag. In this fashion conservation of sewing thread and sealing tape is assured.

An object of the present invention is to provide a bag filling and closing machine, particularly suitable for materials which should not be exposed to the atmosphere for any length of time. Most materials can be exposed without harmful effect, but some materials may not only deteriorate, but may combine with moisture in the atmosphere to produce foreign products harmful to the machine and to the material of the bags. An example of such material is caustic soda which, upon exposure to the atmosphere tends to cake and lump, and also tends to form caustic which corrodes the metal of the machine. The present object is attained by causing the material to be fed from a storage bin through a substantially closed feeding mechanism, into a substantially closed weighing mechanism, from which it is discharged with the least possible contact with the atmosphere.

Another object of the present invention is to combine the advantages of intermittent operation of the weighing and filling mechanism with the advantages to be derived from continuous operation of the closing and sealing mechanism, in spite of the latter mechanism being intermittently operated.

Another object of the present invention is to devise mechanism suitable for use in conjunction with the aforementioned mechanism for receiving the filled bag as it is progressed from the filling station into the subsequent closing mechanism. This receiving mechanism is an improvement upon similar structure described and claimed in the copending application of Robert N. Cundall and Lincoln A. Cundall, Serial No. 666,114, filed April 14, 1933, and comprises opposed, separable belts between which the mouth of the bag may be positioned and gripped. The present improvement concerns itself with the provision of a fixed bag mouth gripping and feeding belt and a cooperating movable bag mouth feeding and gripping belt which may be moved away from the fixed belt in order to provide a wide mouth within which the bag is positioned.

Another object of the present invention is to provide such a bag receiving mechanism capable of use in connection with the entire combination, or as means to receive a filled bag from any source whatsoever.

Another object of the present invention is to provide mechanical means to progress the filled bag from beneath a filling spout into the aforementioned receiving mechanism, the mechanical means being of such a nature as to relieve the operator from severe labor in a machine of the type which requires manual guiding of the bag mouth from the filling station to the feeding belts of the closing station.

Other and further objects and advantages will be apparent from the following description taken in connection with the accompanying drawings wherein like numerals refer to like parts throughout.

Referring to the drawings:

Fig. 1 presents a front elevation of the machine, partially in schematic representation;

Fig. 2 is an enlarged plan view taken along line 2—2 of Fig. 1;

Fig. 3 is an end elevation of the mechanism of Fig. 2, taken along line 3—3;

Fig. 4 is an enlarged end elevation of the mechanism of Fig. 1, partially in schematic representation;

Fig. 5 is a plan view of the charge feeding mechanism, taken on line 5—5 of Fig. 4 and having the cover and storage bin removed therefrom;

Fig. 6 is an enlarged view of the lower portion of Fig. 4, showing greater details of the mechanism;

Fig. 7 is an enlarged horizontal cross-section taken on line 7—7 of Fig. 6;

Fig. 8 is an enlarged horizontal cross-section taken on line 8—8 of Fig. 6;

Fig. 9 is an enlarged horizontal cross-section taken on line 9—9 of Fig. 6;

Fig. 10 is an enlarged vertical cross-section taken on line 10—10 of Fig. 8;

Fig. 11 is an enlarged vertical cross-section taken on line 11—11 of Fig. 7;

Fig. 12 is an enlarged vertical cross-section taken on line 12—12 of Fig. 7;

Fig. 13 is an enlarged vertical cross-section taken on line 13—13 of Fig. 9;

Fig. 14 is an enlarged vertical cross-section taken on line 14—14 of Fig. 8;

Fig. 15 is a schematic wiring diagram for the bag closing and sealing mechanism;

Fig. 16 is a schematic wiring diagram for the charge feeding and weighing mechanism;

Fig. 17 is a vertical cross-section taken on line 17—17 of Fig. 6;

Fig. 18 is an enlarged front elevation of the progressing means for mechanically assisting in the removal of the filled bag from the filling station to the bag receiving end of the closing mechanism;

Fig. 19 is a cross-sectional view taken on line 19—19 of Fig. 18;

Fig. 20 is a view similar to Fig. 18, showing the mechanism in operation;

Fig. 21 is a detail view of a portion of the mechanism, on an enlarged scale, taken on line 21—21 of Fig. 19;

Fig. 22 is a detail view, on an enlarged scale, taken on line 22—22 of Fig. 20 and looking in the direction of the arrows;

Fig. 23 is a plan view of a modified form of the apparatus shown in Fig. 2;

Fig. 24 is a front elevation of the same;

Fig. 29 is an enlarged view of a portion of the driving mechanism; and

Fig. 30 is a cross-section taken on line 30—30 of Fig. 29.

Figure 25:
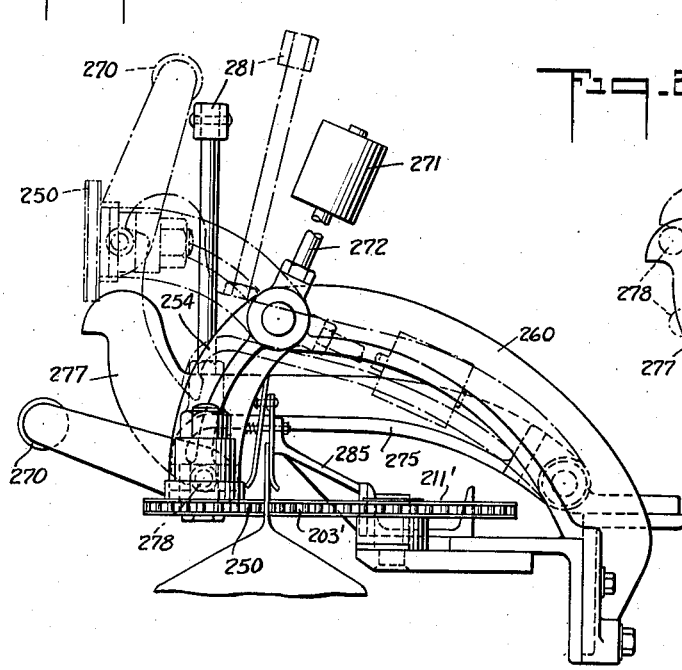
Fig. 25 is an end elevation taken from the position of line 25—25 and looking in the direction of the arrows.
Figure 26:
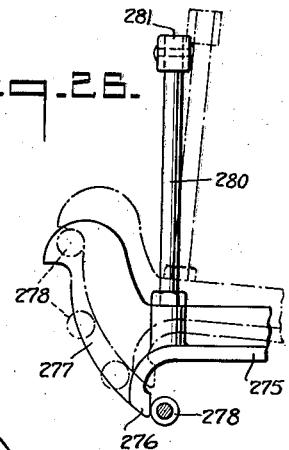
Fig. 26 is a detail view of a portion of the mechanism of Figs. 23, 24, and 25.
Figure 27:
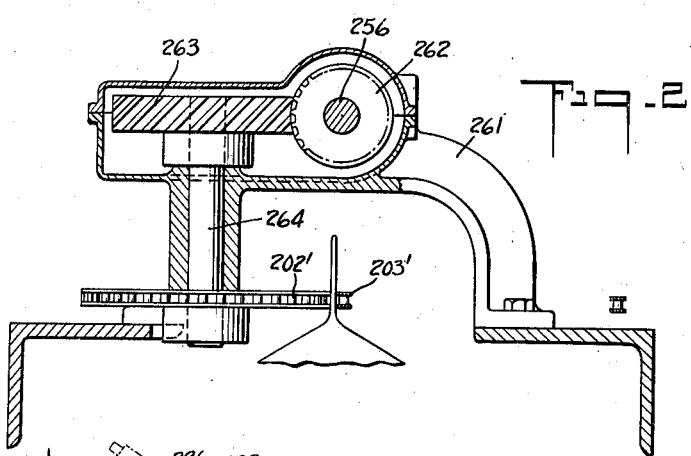
Fig. 27 is a vertical cross-section taken on line 27—27 of Fig. 24.

Referring to Fig. 1, there is indicated at 20 the lower end of a storage bin of sufficient capacity to absorb peak outputs and retain the material until such time as an operator is set to work at filling and closing bags. A screw type conveyor 21, positioned beneath the bin, feeds material into the weighing device 22 which is provided with a scale beam 23 and counterbalance 24. Beneath the weighing device is a hopper 25 terminating at its lower end in an oval shaped filling spout 26, such as the type disclosed and claimed in copending application of Howland F. Briggs, Serial No. 757,761, filed December 17, 1934. Shelf 27, mounted upon the filling spout, may support a sample container 28 into which a sample of the charge may be drawn through a valved outlet 29. Suitable grippers 30 and 31 are mounted, one at each side of the filling spout, to receive and clamp the upper corners of an open mouth bag during the filling operation. The grippers 30 are preferably of the type disclosed and claimed in the aforementioned application of Howland F. Briggs, Serial No. 19,396, filed May 2, 1935. As the bag is being filled, a bag slapping mechanism 32 is actuated rapidly to slap the side of the bag and thereby settle the contents. After the bag is filled, it will be lowered, by mechanism to be described, onto a roller table 33 in which are mounted idle rolls 34, and released from the grippers which are thereafter raised to bag receiving position. The operator now grasps the corners of the bag and rolls it forward into the bag closing and sealing mechanism, where its mouth is adjusted to the proper height, gripped by belts and fed into the closing and sealing mechanism, as will be described after suitable description of the details of the bag filling machine.

Referring to Figs. 4 and 5, it is seen that the lower end of the bin 20 merges into the receiving throat of the material feeding device 21. The feeding device comprises right and left hand conveying screws 40 and 41, which compactly feed the material without injuriously compressing it, extending forward into the delivering portion 43, which terminates in a downwardly extending opening 44 positioned above the weighing device. The screws are driven by means of gears 45 and 46, meshing with worms (not shown) fixed to a driving shaft 47. Shaft 47 is driven by a belt 48 passing about a pulley 49 loosely mounted on the shaft. An outer clutch plate 50 is urged toward the pulley 49 by means of a spring 51 and an inner clutch plate 52 is urged toward the pulley 49 by means of a clutch lever 53 of well known construction. Pulley 49 is continuously driven by a motor 54 mounted on the frame of the machine and preferably provided with a stepped pulley 55 with which the belt 48 may engage for different speeds. The motor is mounted upon a shelf 56 pivoted at 57 and adapted to be shifted and held in different angular positions, by means of bolt 58 and adjusting holes 59, in order that the same belt 48 may be used in connection with the different sizes of pulleys. The clutch lever 53 is operated by a solenoid 60 and linkage 61. The scale beam 23 is preferably provided with a switch 62 of any well known type adapted to be closed by the dumping of the previously weighed charge. The switch may be placed adjacent other suitable moving parts of the scale provided that it be closed as soon as one charge has been dumped and the scale is empty, in order that a succeeding charge may be weighed and held in readiness for the next bag.

Referring to Fig. 16, it is seen that when switch 62 is closed, the solenoid 60 will be energized to engage the clutch and cause material to be fed to the scale. It is obvious that as soon as the counterbalance 24 is raised by an accurately weighed charge of the material, switch 62 will be opened and solenoid 60 deenergized, thereby stopping the flow of material to the scale.

An advantage of the present construction is that the feeding screws 40 and 41 may be stopped without affecting the operation of the scale, merely by disconnecting the line to the motor 54. After the motor is stopped the scale may be tripped to empty the charge held therein, without being caused to receive a succeeding load. In this fashion the scale and filling machine may be emptied at any time that the operator desires, thereby assuring that no portion of the material may be left in contact with the atmosphere to cake or to corrode the mechanism.

The scale container is opened by suitable scale tripping mechanism controlled by the operator upon the initiation of a cycle of operations of the bag filling machine. Referring to Figs. 4, 6, and 9, there is disclosed a motor 70 mounted on a sliding support 71 provided with an adjusting wheel 72 whereby a belt 73 driven by the motor may be tightened. Belt 73 drives a reducing gear mechanism 75 of ordinary construction and a sprocket 76 which drives a sprocket chain 77. Chain 77 passes upward and about a sprocket 78 mounted on a shaft 79 to which is fixed a sprocket 80 driving a chain 81. Chain 81 passes upward to a sprocket 82 fixed to a shaft 83 (Figs. 4 and 8). A sprocket 84 fixed to shaft 83 drives a sprocket 85, fixed to a shaft 86, by means of a chain 87.

Sprocket 78 is loosely mounted with respect to shaft 79 but is fixed to the driving portion of a clutch 90. The driven portion of clutch 90 is fixed to shaft 79, whereby it can be seen that shafts 79, 83, and 86 are not rotated until and unless the clutch is engaged. The clutch is provided with a clutch dog of ordinary construction and a clutch dog lever 91, so mounted in well known fashion as to be spring-urged to engaging position and positively disengaged by a mechanically operated external stop.

The clutch is operated by means of the mechanism shown in Fig. 12, comprising a manually operated engaging lever and an automatically operated disengaging means. The engaging lever 92 extends to the front of the machine and is connected to a bell crank 93 loosely pivoted on a rod 94. The upper arm of the bell crank is provided with a roller 95 engaging a cam 96 fixed to shaft 86. The lower arm of the bell crank is connected to a link 97 extending to a member 98 pivoted to the frame of the machine. Member 98 is provided with an axial bore in which is mounted the clutch stop 99, comprising a bolt-like member slidably urged outward by means of a spring 100. The operation of this mechanism is that the operator, upon pushing the lever 92 inward, disengages the roller 95 from the relieved portion 101 of cam 96 and raises member 98 toward a horizontal position, thereby removing stop 99 from the path of the clutch dog lever 91. The clutch is thereby engaged and shaft 79 commences to rotate, shafts 83 and 86 are driven, and roller 95 engages the circular high portion of cam 96, thereby holding the stop 99 from the path of clutch dog lever 91. Inasmuch as the sizes of the various sprockets tend to rotate shaft 86 very slowly in comparison to shaft 79, the clutch dog lever 91 will pass through many revolutions before roller 95 again drops into the relieved portion 101 and causes the clutch to become disengaged. It can be seen that the operator is relieved from controlling the filling machine drive after he has initiated a cycle of operations.

The bag is held about the open mouth of the spout 26 by means of the grippers 30 and 31, which grippers are substantially duplicates in reversed relationship, one of which will be described. In Fig. 6 there is shown a fixed gripping jaw 105 cooperating with a pivoted gripping jaw 106 operated by a toggle comprising link 107 and pivoted lever 108. A rod 109, connected to lever 108 through ball and socket joint 110 (Fig. 7), opens and closes the jaws when moved longitudinally. Lever 108 is pivoted to the upper portion of fixed jaw 105 which is supported on a rod 111. The rod 111 is fixed to a bracket 112 extending from a braced support 115 which is mounted upon the outer end of the gripper supporting arm 116. One of the grippers, in this instance gripper 31, is vertically fixed in spaced relationship to the spout. The other of the grippers is pivotally mounted to rotate about rod 111 toward and away from the mouth of the spout in order that the grippers may be drawn together to allow spreading of the bag mouth to receive the spout, and forced apart after the bag mouth is lowered from the spout. Mechanical actuation of the pivoting gripper is obtained by means of movement of rod 120, pivoted to an arm 121 and connected to a bell crank 122 mounted upon the support 115. The bell crank is rocked by movement of a rod 123 longitudinally with relation to the supporting arm 116. The opposite end of rod 123 passes through a portion of the frame and is urged toward the rear of the machine by a spring 124. Supporting arm 116 is pivotally mounted on shaft 83, the shaft being freely rotatable with respect thereto, and is upwardly urged at its outer end by springs 125 fixed to the frame. When supporting arm 115 is rocked about shaft 83, as will be explained, rod 123 tends to remain stationary, resulting in outward movement of pivoted gripper 30 upon lowering of the supporting arm 116, and vice versa. The gripper operating mechanism, just described, is similar to that described and claimed in the copending application of Howland F. Briggs, Serial No. 19,396, filed May 2, 1935, aforementioned. However, the present arrangement adapts the device to a stationary spout, whereas the prior invention discloses a moving spout rotating about fixed cams. It will be appreciated that in the present machine the gripper rocking mechanism may be dispensed with inasmuch as the bag is manually handled prior to its insertion in the bag closing mechanism, but that it provides a desirable means of keeping the mouth of the bag in order, and is of further utility in preventing the escape of dust from the bag when removed from the spout.

The gripper supporting arm 116 is maintained in its uppermost position during the time that the machine is idle and during the time that a charge is being dumped into the bag. After the bag is filled, it is lowered onto the rollers 34 by the cams shown in Fig. 10, and released from the grippers by the cams shown in Fig. 11. The grippers are then returned to their upper position and held open in readiness for the next bag.

The gripper raising and lowering mechanism comprises (Figs. 8 and 10), a lowering arm 130, and a raising arm 131 loosely mounted upon shaft 83, each of which is provided with lugs 134 and 135 straddling a boss 136 at the adjacent side of arm 116 and provided with adjusting bolts 137 and 138, respectively, by means of which the angular relationship of the arms may be fixed. Arms 130 and 131 are provided with rollers 140 and 141, respectively, roller 140 bearing upon gripper lowering cam 142 and roller 141 bearing upon gripper raising cam 143, both of said cams being fixed to shaft 86.

The opening and closing of the grippers is accomplished by mechanism illustrated in Figs. 6, 7, 8, and 11. The rods 109, extending from the grippers, pass through the ends of similar levers 150 fixed to rod 94, which is freely rotatable in bearings mounted on the frame. Also fixed to rod 94 is a pair of cam levers 151 and 152 carrying rollers 153 and 154 respectively. Roller 153 bears upon gripper opening cam 155 and roller 154 bears upon gripper closing cam 156, both of which are fixed to shaft 86. The connection of levers 150 to rods 109 is by means of openings allowing angular shifting therebetween, and springs 157 and 158 exerting pressure against the ends of the levers. In the position of Fig. 11 rods 109 are being urged rearwardly of the machine, thereby opening the grippers. The normal, inoperative position of the cams is such that roller 153 is in engagement with the high portion of cam 155 thereby holding the grippers open, and roller 154 is about to engage the inclined portion 160 of cam 156 whereby to close the grippers. The apparently circular portion of cam 156 is slightly helical, thereby increasing the pressure upon the bag mouth as the bag is filled and lowered upon the rolls 34. The grippers are released just prior to the relatively rapid raising of the gripper supporting arm 116. The operator positions a bag between the open jaws of the raised grippers and the first movement of the machine holds the bag, thereby relieving the operator of gripper closing movements. The bag spout may be provided with temporary bag holding means, such as described in the aforementioned application of Howland F. Briggs, Serial No. 19,396, filed May 2, 1935.

The scale tripping mechanism is operated by a cam 165 (Figs. 6, 7, and 14) fixed to shaft 86. A yoke 166, slidably guided by shaft 86, is provided with a cam following roller 167 urged against the cam by a spring 168. The inoperative position of cam 165 is illustrated in Fig. 14, showing that the first few degrees of rotation subsequent to the gripping of the bag causes roller 167 to drop into a low notch 169. Yoke 166 is fixed to a rod 170 connected to a bell crank 171 operating the scale tripping rod 172. Immediately after tripping the scales, the rod is returned to normal position and held until the succeeding cycle of the machine.

Most materials of a pulverulent nature and many granular materials tend to become expanded upon passage through the air, wherefore means 32 is provided to settle the charge within the bag, which comprises a slapping bar 175 adapted to strike rapidly and sharply against the lower, rear side of the bag as it bulges with the charge. Bar 175 is actuated by mechanism shown in Figs. 6, 9, and 13. The bar is adjustable vertically upon vertical supporting levers 176 pivoted to a bracket 177. The upper ends of levers 176 carry a rod 178 to which is connected a threaded rod 179 passing through a portion of the frame. An adjustable spring 180 urges rod 179 to the rear, movement being limited by adjustable nuts 181 which allow angular adjustment of levers 176 and provide adjustment of the strength of blows struck by the slapping bar. An actuating rod 190 is connected to a vertically adjustable rod 191 fixed to levers 176. Rod 191 extends rearwardly above shaft 79, which rapidly rotates during the operation of the machine. The rod is provided with a block to which is attached an actuating hook 192 and, upon its opposite face, with a guiding hook 193. A smooth-faced circular disk 194 is fixed to shaft 79, its upper extremity supporting rod 190 which is retained relative thereto by the spaced hooks 192 and 193. A plurality of rollers 195, mounted upon the face of disk 194, successively engage hook 192, drawing rod 190 rearwardly against the tension of spring 180 which causes the slapping bar to strike a blow as soon as hook 192 is released. Retaining hook 193 passes around and under shaft 79, thereby preventing vertical displacement of hook 192. Vertical adjustment of rod 191 alters the leverage ratio of levers 176, thereby providing adjustment of the arcuate travel of the slapping bar.

The operation of filling a bag having been completed, the filling machine comes to rest and the operation of weighing a succeeding charge terminates automatically, as previously described. The operator now grasps the mouth of the filled bag and urges the bag forward over the idle rollers 34 into the bag closing mechanism. Because of the relatively heavy packages being formed, the bottom of the bag tends to conform to the surfaces of the rollers upon which it rests, thereby imposing considerable resistance to forward travel of the bag. In order that the bag may be easily moved from its position beneath the filling spout into the receiving end of the closing mechanism, there is provided progressing means illustrated in Figs. 1 and 18 to 22, inclusive, to assist the operator in moving the bag forward, which means will be described. The said means move the bag onto the end of table 33, which is provided with a plurality of rollers 200, each driven through a suitable chain of gearing, and each being provided with an overrunning clutch of suitable construction (Fig. 17) whereby the bag may be rolled forward when the bag closing mechanism is not in operation. The operator adjusts the mouth of the bag within the bag mouth gripping belts, shown in Figs. 2 and 3 (or the alternative form shown in Figs. 23 to 28 inclusive) and starts the closing machine, whereupon he may return to place another bag in the filling machine.

The closing machine is driven by a suitable motor, (not shown) through belt 196, driving shaft 197 and suitable gears, sprocket chains and shafting, indicated in schematic representation in Fig. 1. A vertical shaft 198 drives a closing machine bag supporting belt conveyor 201, and through suitable gearing, (schematically represented in Fig. 1) drives the rollers 200, previously mentioned. The operating units of the closing machine comprise the bag supporting belt conveyor 201, bag mouth gripping belts 202 and 203 (or 202' and 203') adapted to grip and guide the mouth of the bag successively through a sewing head 204, a tape applying device 205, tape squeezing rolls 206, and shearing means 207. The sewing and sealing mechanism, preferably, is built in accordance with the disclosure of the aforementioned application of Robert N. Cundall and Lincoln A. Cundall, Serial No. 688,816, filed September 9, 1933. The tape and thread shearing means 207 is preferably made in accordance with the disclosure of copending application of Robert N. Cundall and Lincoln A. Cundall, Serial No. 11,563, filed March 18, 1935. The rolls 200, conveyor belt 201, gripping belts 202 and 203, sewing machine 204, tape applying means 205 and 206, and shearing means 207 are all driven by the independent motor (not shown) through belt 196, so as to operate independently of the filling machine. Details of the foregoing means may be ascertained by inspection of the aforementioned applications.

One form of an improvement whereby the advantages of automatic, continuous operation of the closing means are combined with the advantages of an intermittent filling machine is shown in Figs. 1, 2, 3, and 15, and comprises bag receiving means constituting an improvement upon the similar mechanism described and claimed in the copending application of Robert N. Cundall and Lincoln A. Cundall, Serial No. 666,114, filed April 14, 1933. The belts 202 and 203, preferably, are sprocketed chain belts passing about sprockets 210 and 211, respectively, the inner reaches of the belts being guided substantially in contact to grip and guide the mouth of the bag. Sprocket 210 is a double sprocket which drives an intermediate chain belt 212, driving a double sprocket 213. A swinging belt guide 214 is pivoted to the shaft of sprocket 213 and carries a sprocket 215 at its forward end about which passes a gripping belt 216 driven by sprocket 213. A lever 220 pivoted to the shaft of sprocket 211 and provided with a handle 221 is pivotally connected to a lever 222, the opposite end of which is pivoted to the shaft of sprocket 215. A rod 223 adjustably mounted upon swinging belt guide 214 passes through a slot 224 in lever 220, an adjusting nut carried thereby limiting movement of the lever. When lever 220 is swung to the right, as in Fig. 2, belt 216 will be separated from belt 203, thereby providing an opening or a jaw within which the mouth of the bag may be adjusted. When lever 220 is swung to the left, as in Fig. 1, sprocket 215 will be forced towards sprocket 211 and locked in position by the toggle action of levers 220 and 222, and the bag mouth will be clamped and gripped ready for forward movement.

If the bag closing machine were continuously operated, it can be seen that a great length of tape and sewing thread would be drawn through the machine by the travelling bag. Means are provided automatically to stop the machine upon the bag reaching a position where its trailing edge is opposite sprocket 213. The preferred means comprises a feeler 230 pivoted at 231 and urged into the path of the bags by a spring 232. The feeler will sense the presence of a bag and must be engaged by the forward edge of the bag, being placed by the operator, before the machine will operate. As seen in Fig. 15, feeler 230 operates a contact switch 235 placed in series with a solenoid 240 (Fig. 29) operating the clutch for driving the closing machine. Also in series with switch 235 is a solenoid 236. The clamping of a bag between the swinging belt and the fixed belt and in contact with feeler 230 closes switch 235 and prepares solenoid 236 for operation. A switch 237 in series with the solenoid prevents its operation until the switch 237 is closed by depressing a lever, such as foot treadle 238, or other suitable means. It can be seen that momentary closure of switch 237, when a bag is in position, will operate solenoid 236 to close a switch 239, which will complete a holding circuit. The operator may return to the bag filling machine long before the bag has passed from the range of feeler 230, and the machine will automatically stop as soon as the bag is so progressed. The operator may determine the approximate spacing of the bags in order that a minimum amount of sealing tape and sewing thread is wasted, and in order that the shears 207 may substantially bisect the connecting tape and thread between succeeding bags.

An alternative form of bag receiving means performing the functions of the previously described form is illustrated in Figs. 23 to 28 inclusive. In Fig. 23 there is shown a fixed bag mouth gripping belt 203' cooperating with a fixed bag mouth gripping belt 202', the former passing about sprocket 211', and the latter passing about a sprocket 210'. With the present embodiment, a more desirable construction is presented, since the movable bag receiving belt is adapted to be swung entirely out of the way of the operator in order that accurate adjustment of the bag mouth with respect to the gripping belts, and thereby accurate registry with the bag mouth closing mechanism, may be achieved. The movable belt of the present embodiment comprises a belt 250, passed about sprockets 251 and 252, mounted upon a belt guide 253. The said belt guide is supported by an arm 254 and a bracket 255 depending from a horizontal shaft 256. Mounted in the bracket 255 is a vertical shaft 257 which drives sprocket 251 and which is driven by a helical gear 258 and a driving helical gear 259 fixed to the shaft 256. The shaft 256 is supported by a bearing arm 260 extending from the frame of the machine and a bearing arm 261 likewise extending from the frame of the machine. The end of the shaft 256 adjacent bearing arm 261 has a helical gear 262 fixed thereto, meshing with and driven by a helical gear 263 fixed to a vertical shaft 264 driven by sprocket 210'. A handle 270 is mounted upon the belt guide 253 by means of which the belt 250 and its supporting arms may be moved as a body about shaft 256, as diagrammatically illustrated in Fig. 25.

In order that as little time as possible will be utilized in swinging the swinging belt assembly, a counter-weight for lifting the belt and a latching device for holding it in operative position are provided. The counter-weight comprises a weight 271, carried by rod 272, extending from the bearing of supporting arm 254. The counter-weight is designed automatically to raise the moving belt upon release of the latching device. The latching device comprises a latching arm 275 extending from the frame of the machine and provided at its forward extremity with a latching hook 276 (Fig. 26) and cam extension 277 terminating in a stop 278. Mounted upon belt guide 253 is a latching roller 278 over which the hook 276 and arm 275 may drop when the belt is in operative position, as indicated in full line in Figs. 25 and 26, but which will roll up on the cam surface 277 until engaged by the stop 278, as indicated in dotted outline in Figs. 25 and 26.

A rod 280 extending upward from arm 275 is provided with a handle 281. In operating the device, the bag is first positioned in proper vertical alignment with the movable belt. The handle 270 is then grasped to swing the movable belt into cooperative relationship with the fixed belt, the operation of forcing the movable belt downward causing roller 278 to roll down upon the cam surface 277 until the roller passes the hook end 276 which drops and locks the device in operative position. After the bag is fed into the closing mechanism, the latching device is released simply by striking the handle 281, thereby releasing roller 278.

Figure 28:
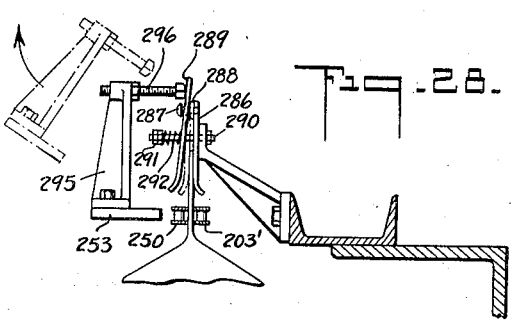
Fig. 28 is a detail view of a portion of the mechanism of Figs. 23, 24, and 25.

In order that the bag may be retained in accurate position, temporary holding means are provided which are released by the operation of closing the swinging belt. Preferably a pair of gripping means, one of which is illustrated in Fig. 28, are provided, each comprising a bracket 285 rising from the frame and supporting a fixed gripping plate 286. Bolt 287, fixed to the upper end of plate 286, supports a spacing member 288 and a loosely mounted movable gripping plate 289. A second bolt 290, passing through bolt plates, extends beyond plate 289 and is provided with nuts 291 whereby the compression of a gripper spring 292 may be varied. Pressure upon the upper end of plate 289 causes the same to pivot about spacing member 288, as shown in full line in Figs. 25 and 26, and release of pressure causes spring 292 to move the plate 289 to the position shown in dotted outline in Fig. 28. The mouth of a bag may be slipped between the gripping plates and adjusted to proper position when the movable gripping belt has been swung upwardly. In order that the temporary gripping means may be released to permit the belts 203' and 250 to progress the bag through the machine, there are provided brackets 295 mounted upon belt-guide 253, each provided with an adjustable abutment 296 adapted to strike the upper end of plate 289 and open the gripping means as shown in Fig. 28.

This second form of bag receiving means is of extreme advantage in that the operator has entire freedom accurately to position the mouth of the bag, and the mouth of the bag is not liable to become disarranged as it is progressed into the bag receiving means.

The progressing means for moving the filled bag is illustrated in Figs. 18 to 22 and comprises a pusher 300 which is actuated to move the bag forward and automatically to return to its original position to receive the next bag. The pusher 300 is supported upon an angle bar 301 fixed to one end of a movable angle bar 302 extending longitudinally of the frame of the machine. The angle bar 302 is guided within an angle bar 303 supported by the frame of the machine and is provided with guide rollers 304. Angle bar 302 also extends beyond the angle bar 303 and is passed between guide rollers 304 and 305 preventing lateral deviation of the angle bar. The free end of bar 301 carries a vertical rod 306 provided with a wheel 307 rolling upon the edge frame plate of the roller conveyor table 33. The pusher 300 is thereby rigidly fixed to a rigidly guided movable assembly.

In order that the pusher may be connected to the source of power, there is provided a rack 310, fixed to the underside of the longitudinal angle bar 302, and meshing with a spur gear 311 driven by a shaft 312. Shaft 312 extends toward the rear of the frame through a supporting bearing 315, and a bevelled gear 316, comprising the driven element of a clutch, is loosely mounted upon the shaft. Gear 316 meshes with a bevelled gear 317 fixed to a longitudinal drive-shaft 318 driven by a sprocket-chain 319 from the shaft 197. The details of the means whereby drive-shaft 318 is continuously driven while shaft 197 is only occasionally driven will be described later. Shaft 318, being continuously driven, continuously drives gear 316. The opposite element of the clutch comprises a pulley 325 fixed to shaft 312 by a sliding key, and normally urged to disengaged position by a spring 326. Pulley 325 is shifted longitudinally of shaft 312 by a forked lever 327 pivoted at 328 to an extension of the frame. The tips of the forked end of lever 327 are provided with rollers 328' positioned between an anti-friction device 329, located adjacent a collar 330 at the end of the shaft, and an anti-friction device 331, located adjacent the end of pulley 325. Lever 327 is pivotally attached to a sliding wedge member 340 mounted upon a rod 341. The spring 326 holds wedge member 340 against a matching wedge member 342 pinned to rod 341. Rotation of the rod in clockwise direction spreads the wedge members and causes the clutch to engage, thereby rotating shaft 312 to drive the spur gear 311 and rack 310, causing longitudinal movement of pusher 300 toward the left, as in Fig. 20.

In order that the operator may control the spread of wedge members 340 and 342, rod 341 is provided with a crank arm 345 connected to a link 346 extending to a bell crank 347 mounted at the bottom of the frame. A link 348 extends to a crank 349 fixed to a rod provided with a foot treadle 350. Depression of the treadle 350 from the position of Fig. 18 to the position of Fig. 20 causes the spreading of the wedge members and engagement of the clutch. A spring 351 holds the linkage against return until it is manually or automatically returned. The angular pitch of the matching faces of wedge members 340 and 342 is such that rotation of rod 341 cannot be caused by the action of spring 351 alone. In order that the clutch may be disengaged at the proper instant, there is provided an adjustable abutment 352, fixed to traveling angle bar 302, and adapted to strike a disengaging lever 353, fixed to rod 341, which returns the linkage against the tension of spring 351.

As soon as the clutch is disengaged, the pusher 300 ceases its forward travel and is returned by suitable mechanism, comprising the following: Mounted upon the angle bar 303 is a guiding bracket 360 through which passes a sliding rod 361, attached to a spring 362 extending to the frame of the machine, and which carries a double pulley 363 at its free end. A cord 365 attached to a hook 366, mounted at the end of angle bar 302, passes about a pulley 367 attached to a portion of the frame, then about pulley 363, a second fixed pulley 368, and back to pulley 363 in the fashion of a block and tackle. As the pusher moves forward under the influence of the rack and pinion, the distance between pulleys 363 and 367 is shortened, thereby extending the spring 362. Upon the release of the clutch, the spring 362, through the block and tackle arrangement, will return the pusher to its previous position. Obviously, the greater the number of pulleys used, the shorter will be the travel of the rod 361 and the lesser the required size of the spring 362. As an adjunct to the spring and block and tackle, or as a separate returning means, there is provided a cord 370 fixed to the pulley 325, passing around fixed pulleys 371, and extending to a weight 372. As the clutch is engaged, the weight will be raised, and when the clutch is disengaged, the weight will unwind the cord from the pulley, thereby turning shaft 312 and causing the pusher to return to its original position. Even though the spring 362 may be of sufficient strength, the arrangement of the pulley 325, cord 370 and weight 372, is advisable as a governor. If desired, however, the spring 362 may be dispensed with entirely, and the weight 372 utilized both as a returning means and as a governor to prevent shock.

As previously mentioned, the shaft 318 operating the bag pusher is continuously driven, but the operating mechanisms of the bag closing machine such as the bag gripping belts, sewing machine, tape applier, etc., and their driving shaft 197 are intermittently operated. The mechanism for accomplishing this driving from the same motor is represented in a convenient form in Figs. 29 and 30. The driving belt 196 from the motor passes about a pulley 400 loosely mounted on shaft 197. The hub of pulley 400 is extended and a sprocket 401 is fixed thereto, the sprocket-chain 319 and shaft 318 being driven thereby. Also fixed to sprocket 401 and pulley 400 is the driving element 402 of a clutch. The driven element 403 of the clutch is keyed to shaft 197, being capable of longitudinal movement along the key, but incapable of relative rotation with respect to the shaft. Adjacent the hub of clutch element 403 is loosely mounted a cam arm 404 which is held against rotative movement by a link 405 extending through and resiliently fastened to a bracket 406 fixed to the frame of the machine. The cam arm 404 carries a pair of cams 407 and 408, facing outwardly. Also loosely mounted upon shaft 197 is a matching cam arm 410 carrying matching cams 411 and 412, facing inwardly. Arm 410 is fixed to a link 415, the opposite end of which comprises the core of the solenoid 240 (Fig. 15) which is actuated by the bag sensing device previously described. Actuation of solenoid 240 causes the cams 407 and 411 to engage, and 408 and 412 to engage, thereby shifting the clutch element 403 into engagement with clutch element 402, and causing rotation of shaft 197 to drive the bag closing mechanism. The assemblage is held in position by a collar 415' and a second collar 416 provided with adjusting means 417. The above mechanism is a simple form of clutch engaging device, and other forms are of course capable of achieving the same functions.

A brief statement of operation is as follows: The upper corners of a bag are placed within the open raised jaws of the grippers. Lever 92 is pushed to the rear, engaging clutch 90 and thereby initiating a cycle of the filling machine. The grippers 30 and 31 are closed and the scale container is tripped to discharge the load into the bag. About the time that the entire load is in the bag, the grippers are lowered and may be spread, by reason of the pivoted gripping jaw, to collapse the mouth of the bag. Substantially simultaneously the scale container closes itself and a succeeding charge is fed forward by screws 40 and 41 and weighed by the scale, which is then in readiness for the next operation. During the time that the bag is being filled and lowered, the slapping bar 32 is rapidly and energetically striking the side of the bag to settle the charge. The grippers are opened to release the bag and sharply raised to normal position, whereupon the clutch is disengaged. The filled bag is then rolled forward on rollers 34 and overrunning clutch rollers 200 into the space between swinging guide 214 (or 253) and the fixed rear belt, which space has been provided by the operator as soon as grippers 30 and 31 have closed and released his hands for such an operation. The bag mouth is adjusted as to height and arrangement of the plies, whereupon the swinging belt is closed and treadle 238 depressed as described. The bag travels forward for its own length and whatever additional space the operator has provided within the operating limits of feeler 230. The operator, in the meantime, picks up an empty bag, places it about the spout and proceeds to initiate a succeeding cycle. He is now free to open the swinging belt, inasmuch as the previous bag has had sufficient time to travel beyond the range of feeler 230 and the closing and filling mechanism has come to rest. If, for any reason, the available supply in bin 20 is exhausted, or the operator determines not to fill further bags, he may leave the series of bags in the filling and closing machine, or he may cause them to be filled and sealed by manually actuating feeler 230 and depressing treadle 238 until the last bag has been ejected from the machine. It can be seen that all controls are readily available and require a minimum of time and motion on the operator's part.

The present disclosure is of the preferred form of the invention and modifications in part. Modifications in arrangement and detail may be apparent to those skilled in the art. We do not intend to be limited to the present disclosure, but claim as our invention such modifications as come within the scope of the following claims.

We claim:

1. A bag filling and closing machine comprising means to fill an open-mouth bag with a predetermined quantity of material, said means comprising a relatively fixed spout through which the material flows into the bag and movable grippers adapted to grip the upper corners of the bag and hold its mouth about said spout during the filling of the bag, means to actuate said grippers to lower the bag after it is filled and to release the corners thereof after it is lowered, a conveying device extending beneath the filling means comprising a bag pushing mechanism actuated to move the filled bag forward from beneath the filling means, and a pair of bag mouth gripping belts positioned above the forward end of said conveyor, one of said belts being mounted upon a pivoted guide having means associated therewith to separate said belts in order to receive the mouth of the bag and to bring said belts together to grip the mouth of the bag for guidance through the closing machine.

2. A bag filling and closing machine comprising means to fill an open-mouth bag with a predetermined quantity of material, said means comprising a relatively fixed spout through which the material flows into the bag and movable grippers adapted to grip the upper corners of the bag and hold its mouth about said spout during the filling of the bag, means to actuate said grippers to lower the bag after it is filled and to release the corners thereof after it is lowered, a conveyor extending beneath the filling means comprising a bag pushing mechanism actuated to move the filled bag forward from beneath the filling means, and a pair of bag mouth gripping belts positioned above the forward end of the conveyor, one of said belts being mounted upon a pivoted guide having a linkage associated with the free end thereof whereby said belts may be divergently separated to receive the mouth of the bag and brought together to grip the mouth of the bag for guidance through the closing machine.

3. A bag filling and closing machine comprising means to fill an open-mouth bag with a predetermined quantity of material, said means comprising a relatively fixed spout through which the material flows into the bag and movable grippers adapted to grip the upper corners of the bag and hold its mouth about said spout during the filling of the bag, means to actuate said grippers to lower the bag after it is filled and to release the corners thereof after it is lowered, a conveyor extending beneath the filling means comprising a bag pushing mechanism actuated to move the filled bag forward from beneath the filling means, and a pair of bag mouth gripping belts positioned above the forward end of the conveyor, one of said belts being mounted upon a guide having means associated therewith whereby said belt may be raised to provide a space to receive the mouth of the bag and lowered to cause said belts to grip the mouth of the bag for guidance through the closing machine.

4. A bag filling and closing machine comprising means to fill an open-mouth bag with a predetermined quantity of material, said means comprising a relatively fixed spout through which the material flows into the bag and movable grippers adapted to grip the upper corners of the bag and hold its mouth about said spout during the filling of the bag, means to actuate said grippers to lower the bag after it is filled and to release the corners thereof after it is lowered, a conveying device extending beneath the filling means comprising a bag pushing mechanism actuated to move the filled bag forward from beneath the filling means, a pair of bag mouth gripping belts positioned above the forward end of said conveyor, one of said belts being mounted upon a pivoted guide having means associated therewith to space the same from the other of said belts to receive the mouth of the bag and to bring said belts together to grip the mouth of the bag for guidance through the closing machine, a driving means for said belts, and a control therefor comprising a feeler pivotally mounted adjacent the movably mounted belt to sense the presence of a bag within the grip of said belts.

5. A bag filling and closing machine comprising means to fill an open-mouth bag with a predetermined quantity of material, said means comprising a relatively fixed spout through which the material flows into the bag and movable grippers adapted to grip the upper corners of the bag and hold its mouth about said spout during the filling of the bag, means to actuate said grippers to lower the bag after it is filled and to release the corners thereof after it is lowered, a conveying device extending beneath the filling means comprising a bag pushing mechanism actuated to move the filled bag forward from beneath the filling means, a pair of bag mouth gripping belts positioned above the forward end of said conveyor, one of said belts being mounted upon a pivoted guide having means associated therewith to separate said belts in order to receive the mouth of the bag and to bring said belts together to grip the mouth of the bag for guidance through the closing machine, a driving means for said belts and a control therefor comprising a feeler pivotally mounted adjacent the movable belt to sense the presence of a bag within the grip of said belts, a preparatory circuit comprising a switch operated by said feeler and a manually operable switch in series therewith, and a holding circuit comprising a solenoid energized by said preparatory circuit.

6. In a bag closing mechanism, a conveyor comprising a plurality of rolls, each including an overrunning clutch whereby a filled bag may be manually guided forward thereon or positively carried forward thereby, and a pair of bag mouth gripping belts positioned above said conveyor, one of said belts being mounted upon a pivoted guide having means associated therewith to separate said belts in order to receive the mouth of the bag and to bring said belts together to grip the mouth of the bag for guidance through the closing machine.

7. In a bag closing mechanism, a conveyor comprising a plurality of rolls, each including an overrunning clutch whereby a filled bag may be manually guided forward thereon or positively carried forward thereby, and a pair of bag mouth gripping belts positioned above said conveyor, one of said belts being mounted upon a pivoted guide having a linkage associated with the free end thereof whereby said belts may be divergently separated to receive the mouth of the bag and brought together to grip the mouth of the bag for guidance through the closing machine.

8. In a bag closing mechanism, a conveyor comprising a plurality of rolls, each including an overrunning clutch whereby a filled bag may be manually guided forward thereon or positively carried forward thereby, and a pair of bag mouth gripping belts positioned above said conveyor, one of said belts being mounted upon a guide having means associated therewith whereby said belt may be raised to provide a space to receive the mouth of the bag and lowered to cause said belts to grip the mouth of the bag for guidance through the closing machine.

9. In a bag closing mechanism, a conveyor comprising a plurality of rolls, each including an overrunning clutch whereby a filled bag may be manually guided forward thereon or positively carried forward thereby, a pair of bag mouth gripping belts positioned above said conveyor, one of said belts being mounted upon a pivoted guide having means associated therewith to separate said belts in order to receive the mouth of the bag and to bring said belts together to grip the mouth of the bag for guidance through the closing machine, a driving means for said belt and a control therefor comprising a feeler pivotally mounted adjacent the movable belt to sense the presence of a bag within the grip of said belts.

10. In a bag closing mechanism, a conveyor comprising a plurality of rolls, each including an overrunning clutch whereby a filled bag may be manually guided forward thereon or positively carried forward thereby, a pair of bag mouth gripping belts positioned above said conveyor, one of said belts being mounted upon a pivoted guide having means associated therewith to separate said belts in order to receive the mouth of the bag and to bring said belts together to grip the mouth of the bag for guidance through the closing machine, a driving means for said belt and a control therefor comprising a feeler pivotally mounted adjacent the movable belt to sense the presence of a bag within the grip of said belts, a preparatory circuit comprising a switch operated by said feeler and a manually operable switch in series therewith, and a holding circuit comprising a solenoid energized by said preparatory circuit.

11. In a bag closing mechanism a pair of bag mouth gripping belts adapted to guide the mouth of the bag through the closing mechanism, one of said belts being mounted upon a pivoted guide having means associated therewith whereby said belts may be separated to receive the mouth of a bag and brought together to grip the mouth of the bag, and the other of said belts being fixed.

12. In a bag closing machine, a conveyor upon which the bag is supported, a pair of bag mouth gripping belts positioned above said conveyor, one of said belts being mounted upon a pivoted guide having a linkage associated with the free end thereof whereby said belts may be divergently separated to receive the mouth of the bag and brought together to grip the mouth of the bag for guidance through the closing machine, said conveyor and said belts being driven by the same source of power, and a control means therefor comprising a feeler pivotally mounted adjacent the movable belt to sense the presence of a bag within the grip of said belts.

13. In a bag closing machine, a conveyor upon which the bag is supported, a pair of bag mouth gripping belts positioned above said conveyor, one of said belts being mounted upon a pivoted guide having a linkage associated with the free end thereof whereby said belts may be divergently separated to receive the mouth of the bag and brought together to grip the mouth of the bag for guidance through the closing machine, said conveyor and said belts being driven by the same source of power, and a control means therefor comprising a feeler pivotally mounted adjacent the movable belt to sense the presence of a bag within the grip of said belts, a preparatory circuit comprising a switch operated by said feeler and a manually operable switch in series therewith, and a holding circuit comprising a solenoid energized by said preparatory circuit.

14. In a filled bag closing mechanism, means to guide the mouth of the bag through the closing mechanism comprising a pair of opposed bag mouth gripping belts, one of said belts being separable from the other of said belts in order to receive the bag therebetween, and means to position the bag between said belts comprising a bag pushing device and a bag supporting conveyor table upon which the filled bag is supported and moved forward by said pushing device.

15. In a filled bag closing mechanism, means to guide the mouth of the bag through the closing mechanism comprising a pair of opposed bag mouth gripping belts, one of said belts being separable from the other of said belts in order to receive the bag therebetween, and means to position the bag between said belts comprising a bag pushing device and a bag supporting conveyor table upon which the filled bag is supported and moved forward by said pushing device, said pushing device comprising a plate adapted to engage the filled bag and means to connect said plate to a source of power.

16. In a filled bag closing mechanism, means to guide the mouth of the bag through the closing mechanism comprising a pair of opposed bag mouth gripping belts, one of said belts being separable from the other of said belts in order to receive the bag therebetween, and means to position the bag between said belts comprising a bag pushing device and a bag supporting conveyor table upon which the filled bag is supported and moved forward by said pushing device, said pushing device comprising a plate adapted to engage the filled bag, means to connect said plate to a source of power and a tripping device associated therewith to disconnect the plate from the source of power at the end of its movement.

17. In a filled bag closing mechanism, means to guide the mouth of the bag through the closing mechanism comprising a pair of opposed bag mouth gripping belts, one of said belts being separable from the other of said belts in order to receive the bag therebetween, and means to position the bag between said belts comprising a bag pushing device and a bag supporting conveyor table upon which the filled bag is supported and moved forward by said pushing device, said pushing device comprising a plate adapted to engage the filled bag, means to connect said plate to a source of power, a tripping device associated therewith to disconnect the plate from the source of power at the end of its movement, and means to return said plate to its starting position.

18. In a filled bag closing mechanism a pair of bag mouth gripping belts, a pivoted guide upon which one of said belts is mounted, means to separate said pivoted guide from proximity with the other of said belts in order to provide a bag mouth receiving space, and temporary bag mouth holding clamps adapted to hold the mouth of the bag until said guide is returned to cause said belts to grip the mouth of the bag for guidance through the machine.

19. In a filled bag closing mechanism a pair of bag mouth gripping belts, a pivoted guide upon which one of said belts is mounted, means to separate said pivoted guide from proximity with the other of said belts in order to provide a bag mouth receiving space, temporary bag mouth holding clamps adapted to hold the mouth of the bag until said guide is returned to cause said belts to grip the mouth of the bag for guidance through the machine, and means associated with said guide to release said temporary holding means.

20. In a filled bag closing mechanism a pair of bag mouth gripping belts, a pivoted guide upon which one of said belts is mounted, means to separate said pivoted guide from proximity with the other of said belts in order to provide a bag mouth receiving space, temporary bag mouth holding clamps adapted to hold the mouth of the bag until said guide is returned to cause said belts to grip the mouth of the bag for guidance through the machine, means associated with said guide to release said temporary holding means, and a feeler adapted to sense the presence of a bag mouth within the grip of said clamps.

WEBSTER NOYES BAKER.
ROBERT N. CUNDALL.